US008883353B2

(12) United States Patent
Streuer

(10) Patent No.: US 8,883,353 B2
(45) Date of Patent: Nov. 11, 2014

(54) ROLLED ELECTRODE FOR A STORAGE BATTERY

(75) Inventor: Peter Streuer, Hannover (DE)

(73) Assignee: Johnson Controls Autobatterie GmbH & Co. KGaA (DE)

( * ) Notice: Subject to any disclaimer, the term of this patent is extended or adjusted under 35 U.S.C. 154(b) by 861 days.

(21) Appl. No.: 13/127,685

(22) PCT Filed: Oct. 28, 2009

(86) PCT No.: PCT/EP2009/007714
§ 371 (c)(1),
(2), (4) Date: May 18, 2011

(87) PCT Pub. No.: WO2010/051931
PCT Pub. Date: May 14, 2010

(65) Prior Publication Data
US 2011/0212368 A1    Sep. 1, 2011

(30) Foreign Application Priority Data

Nov. 4, 2008  (DE) .................. 10 2008 055 775

(51) Int. Cl.
| | | |
|---|---|---|
| *H01M 4/74* | (2006.01) | |
| *H01M 4/82* | (2006.01) | |
| *B23P 19/00* | (2006.01) | |
| *H01M 4/73* | (2006.01) | |
| *B21H 8/00* | (2006.01) | |
| *H01M 4/16* | (2006.01) | |
| *H01M 4/68* | (2006.01) | |
| *H01M 10/04* | (2006.01) | |
| *H01M 10/06* | (2006.01) | |

(52) U.S. Cl.
CPC . *H01M 4/73* (2013.01); *B21H 8/00* (2013.01); *H01M 4/16* (2013.01); *H01M 4/68* (2013.01); *H01M 10/0413* (2013.01); *H01M 10/06* (2013.01); *Y02E 60/126* (2013.01)
USPC .............................. 429/241; 29/623.1; 29/731

(58) Field of Classification Search
USPC ....................................................... 429/241
See application file for complete search history.

(56) References Cited

U.S. PATENT DOCUMENTS

| | | | |
|---|---|---|---|
| 1,347,873 A | 7/1920 | Rabe | |
| 1,364,760 A | 1/1921 | Holland | |
| 6,232,017 B1 * | 5/2001 | Tsuchida et al. | ............... 429/234 |
| 2001/0042288 A1 * | 11/2001 | Omae et al. | ........................ 29/2 |
| 2007/0111089 A1 | 5/2007 | Swan | |

FOREIGN PATENT DOCUMENTS

| | | |
|---|---|---|
| DE | 24 61 199 A1 | 7/1975 |
| DE | 3913546 | 10/1990 |

(Continued)

OTHER PUBLICATIONS

International Preliminary Search Report on Patentability for International Application No. PCT/EP09/007714 dated May 19, 2011 (English translation).

*Primary Examiner* — Muhammad Siddiquee
(74) *Attorney, Agent, or Firm* — Boardman & Clark LLP

(57) ABSTRACT

The invention relates to a rolled electrode for a storage battery, wherein the electrode (10) is of substantially plate-like design and has a frame (12, 13, 15, 17) with a grid (16) arranged therein. A contact lug (14) for connecting the electrode to a battery pole is also provided on the frame (12, 13, 15, 17). Electrodes of this type are used, for example, in lead-acid storage batteries for vehicles, for example as a starter battery. The intention is to specify an electrode with improved electrical and mechanical properties and also possible ways of producing said electrode. To this end, the frame (12, 13, 15, 17) and/or the contact lug (14) in the electrode according to the invention have/has a greater thickness than the grid (16) arranged therein, at least in specific regions. A machine for producing such an electrode and a production method are also specified.

10 Claims, 3 Drawing Sheets

(56) References Cited

FOREIGN PATENT DOCUMENTS

Figure 5:
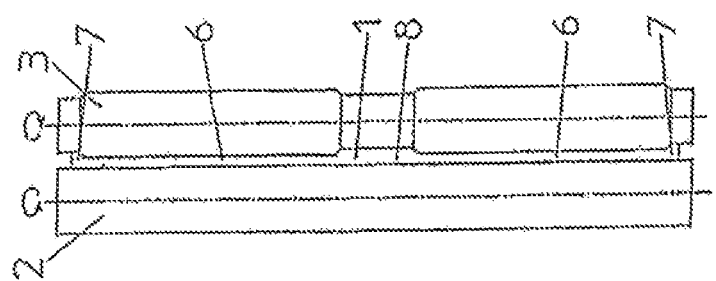

| | | |
|---|---|---|
| DE | 69727787 | 9/2004 |
| EP | 0 622 161 A | 11/1994 |
| EP | 1 317 007 A | 6/2003 |
| GB | 799308 | 8/1958 |
| JP | 58 201251 A | 11/1983 |
| WO | WO 01/04977 | 1/2001 |

\* cited by examiner

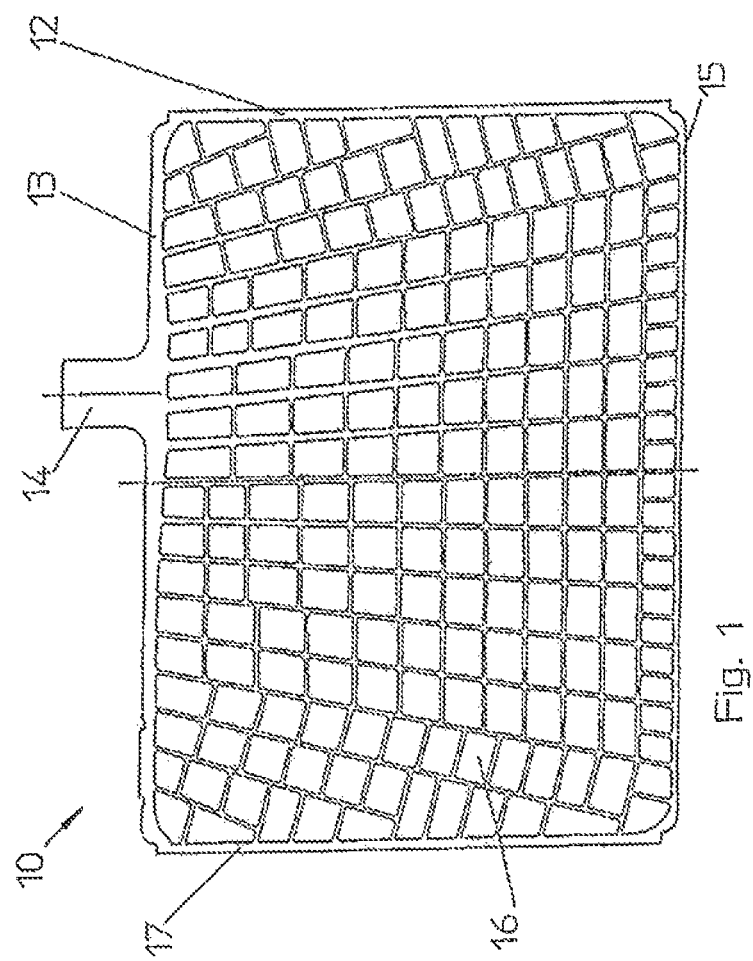

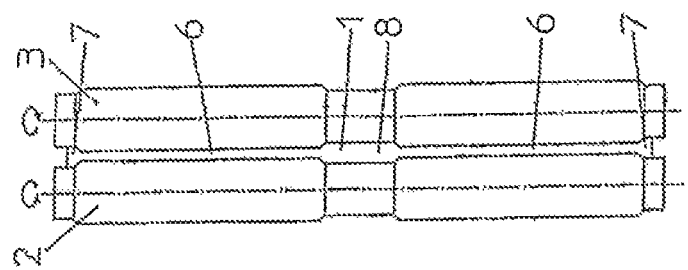
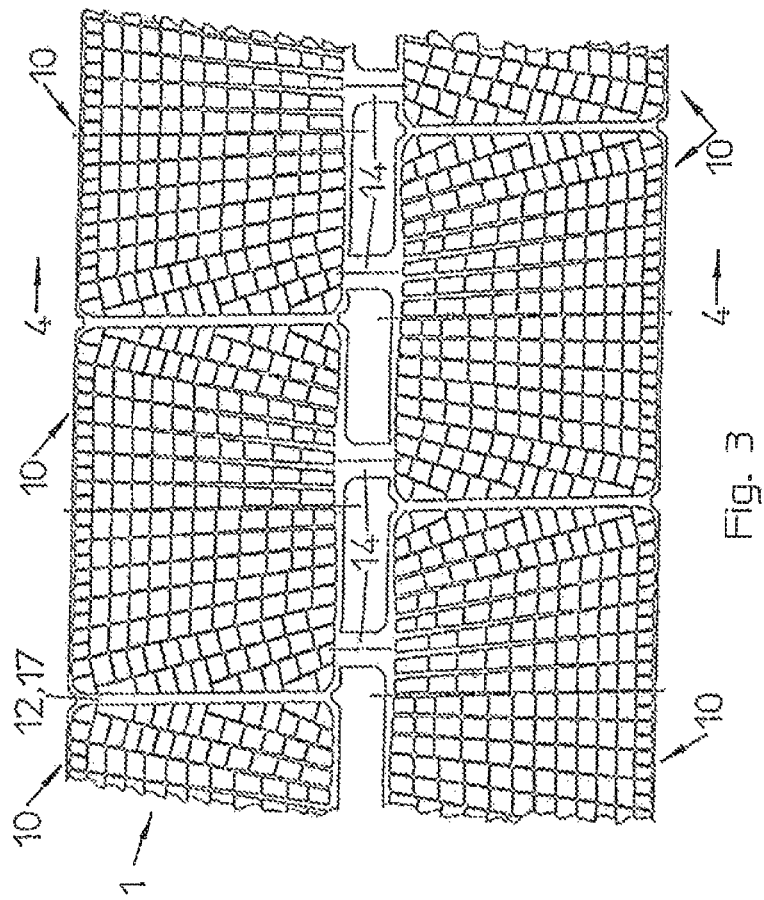

ROLLED ELECTRODE FOR A STORAGE BATTERY

The invention relates to a rolled electrode for a rechargeable battery according to the preamble of patent claim 1. The invention also relates to a machine for production of an electrode such as this, and to a production method for this purpose.

By way of example, an electrode of this generic type is known from WO 01/04977 A1.

Electrodes such as these are normally rolled to a desired shape from electrode material in the form of a strand, normally lead, on roller machines. In this case, for example, appropriate cutouts are provided in the electrode by stamping out, by which means an electrode inner structure in the form of a grid is created.

Electrodes such as these are used, for example, in lead-acid rechargeable batteries for vehicles, for example as a starter battery. In the course of general efficiency and cost improvements for rechargeable batteries such as these, it is desirable to also improve the electrical and mechanical characteristics of the electrodes.

The invention is therefore based on the object of specifying an electrode with improved electrical and mechanical characteristics, as well as options for its production.

This object is achieved by the electrode according to the invention as specified in patent claim 1. An advantageous machine for production of an electrode such as this is specified in claim 8. Furthermore, an advantageous production method for the electrode according to the invention is specified in claim 11. Advantageous developments are disclosed in the dependent claims.

The rolled electrode according to the invention has the advantage that increased mechanical strength is achieved by increasing the thickness in certain areas of the electrode, which is on the one hand advantageous for the production of a rechargeable battery, and on the other hand also leads to greater durability and a longer life during subsequent operation of the rechargeable battery. During the production of the rechargeable battery, the greater mechanical robustness is advantageous when the electrodes are being inserted into a battery housing, and this may be done more quickly and with an increased mechanical force because of the greater robustness of the electrode according to the invention. This makes it possible to reduce the manufacturing times for a rechargeable battery, and therefore its production costs. Furthermore, the manufacturing waste can be reduced.

In the case of rolled electrodes, the previous prior art provided for the electrodes to be manufactured from material with a uniform thickness, in particular as a result of the rolling process. However, as a rolled electrode, the electrode according to the invention has certain areas which have a greater thickness than the grid arranged in them. An advantageous machine for production of a rolled electrode such as this is specified in claim 8. A production method for a rolled electrode such as this is specified in claim 11.

A further advantage of the electrode according to the invention is that the material thickness can be reduced in those areas of the electrode whose thickness is not increased. This leads to a material saving, which is desirable for both ecological and economical reasons. Electrodes with a reduced material thickness in the area of the grid furthermore result in the rechargeable battery having better electrical efficiency.

Figure 6:
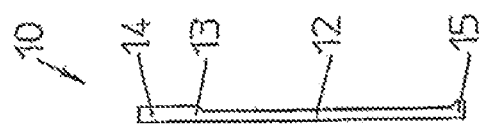

The invention will be explained in more detail in the following text using exemplary embodiments and with reference to drawings, in which:

FIG. 1 shows a plan view of a rolled electrode, and
FIG. 2 shows a side view of a rolled electrode, and
FIG. 3 shows a plan view of electrode material in the form of a strand, during the production process, and
FIG. 4 shows a side view of the electrode material as shown in FIG. 3, as well as parts of a machine, and
FIG. 5 shows an alternative embodiment of rollers, and
FIG. 6 shows a side view of an electrode produced using the embodiment of the rollers as shown in FIG. 5.

The same reference symbols are used for mutually corresponding elements in the figures.

FIG. 1 shows an electrode 10 which is produced, for example, from lead. The electrode 10 has a frame 12, 13, 15, 17 which is formed from four sections. As shown in the illustration in FIG. 1, the section 12 forms a right-hand frame area, the section 13 forms an upper frame area, the section 15 forms a lower frame area, and the section 17 forms a left-hand frame area. The electrode material within the frame 12, 13, 15, 17 is in the form of a grid 16. By way of example, the grid 16 can be produced by stamping sections out from electrode material (lead) which is initially cast and is then rolled flat. As can be seen, the frame sections are each arranged in pairs substantially parallel to one another and each form mutually opposite boundaries of the grid 16 arranged between them, that is to say the left-hand frame section 17 is parallel to the right-hand frame section 12, and the upper frame section 13 is parallel to the lower frame section 15. This results in the electrode being substantially rectangular.

On the upper frame section 13, the electrode 10 is provided with a contact lug 14 which is integrally formed on it. The contact lug is used for electrical coupling of the electrode 10 to one pole of the rechargeable battery. In this case, sets of electrodes, which are normally arranged parallel in the rechargeable battery, are connected to one another, and are additionally connected to a rechargeable battery pole, via their respective contact lugs 14.

FIG. 2 shows a side view of the electrode 10 shown in FIG. 1. As can be seen, the electrode 10 has a greater thickness in the area of the contact lug 14, of the upper frame section 13 and of the lower frame section 15 than in the central area, which is represented in FIG. 2 by the frame section 12 which can be seen in this case. It is advantageous for the thickness of the grid 16 to be identical to the thickness of the frame sections 12, 17.

It is likewise advantageous for only one or individual sections 13, 15 of the frame 12, 13, 15, 17 or of one of the pairs of mutually opposite sections 13, 15 of the frame 12, 13, 15, 17 to have a greater thickness than the grid 16. It is likewise advantageous, for example, for only the contact lug 14 to have a greater thickness than the grid 16.

FIG. 2 illustrates the frame sections 13, 15 and the contact lug 14 with the same thickness. Depending on the application, it may also be advantageous, for example, for only the contact lug 14 or the contact lug 14 and the upper frame section 13 to have a greater thickness, and for the lower frame section 15 to have a reduced thickness. For example, it is advantageous for the frame section 15 to have the same thickness as the grid 16. This allows the electrode to be inserted easily into relatively narrow holding areas in the rechargeable battery.

FIG. 2 also shows that the areas 13, 14, 15 of the electrode with a greater thickness with respect to the grid 16 are thickened approximately symmetrically. Depending on the application, it may also be advantageous for the thickness to be increased in certain areas on only one side.

FIG. 3 shows electrode material 1 in the form of a strand, which is moved in direction 4 by feed means on a machine for production of electrodes according to the invention. By way of example, the feed means may be a conveyor belt. The electrode material 1 in the form of a strand advantageously consists of previously rolled lead which has been provided with stamped-out areas for the grid structure. As shown in FIG. 3, the electrode material 1 is prepared such that individual electrodes 10 are arranged adjacent to one another in two rows, with the sides facing one another being equipped with the contact lugs 14. In this case, the respective left-hand and right-hand frame sections 12, 17 of two adjacent electrodes 10 are connected to one another. The contact lugs 14 are connected to the respectively opposite electrode 10, that is to say to its frame section 13. These connections are disconnected during a subsequent production step, thus creating individual electrodes 10 as shown in FIG. 1.

On the machine, the electrode material 1 is passed through a pair of rollers 2, 3, as illustrated in FIG. 4. FIG. 4 shows a side view of the electrode material, a plan view of which is shown in FIG. 3. The rollers 2, 3 are driven in opposite rotation senses, such that the electrode material 1 is drawn through them. A roller opening 6, 7, 8 is formed between the rollers 2, 3. As is shown in FIG. 4, the roller opening advantageously has a profile in which areas 7 of greater width are formed at the respective end of the rollers 2, 3 than in areas 6, 8 located inbetween. A further area 8 of greater width than in the areas 6 is formed in a central area of the rollers, between the areas 6. This form of profiling of the rollers 2, 3 advantageously results in electrodes being produced with the profile illustrated in FIG. 2.

FIG. 5 illustrates a further embodiment of the rollers 2, 3 where the roller 2 has a continuously smooth surface profile, without any depressions, in the areas 6, 7, 8, while the roller 3 has the profile already illustrated in FIG. 4. This advantageously makes it possible to produce electrodes 10 with areas of greater thickness formed on only one side, as is illustrated by way of example in FIG. 6.

According to one advantageous method for production of an electrode, electrode material 1 in the form of a strand is passed through a roller machine. The rollers 2, 3 of the roller machine are advantageously provided with a specific profile, for example as explained with reference to FIG. 3 or 5. The electrode material emerging from the rollers then has electrodes which have a greater thickness at least in certain areas than in the area of the grid 16. After this, the electrode material 1 is separated into individual electrodes 10.

The invention claimed is:

1. A rolled electrode for a rechargeable battery comprising: an electrode substantially in the form of a plate and having a frame with a grid provided in the frame and a contact lug provided on the frame for connection of the electrode to a battery pole, wherein one of the frame or the contact lug has a portion having a greater thickness than the grid provided in the frame, and wherein the rolled electrode is formed by rolling through profiled rollers such electrode material which emerges from the rollers comprises electrodes having the portion having a greater thickness than the grid structure;
wherein the frame of the rolled electrode includes an upper frame section, a lower frame section and a pair of opposing side frame sections, wherein the upper frame section is provided substantially parallel to the lower frame section, and wherein the upper and lower frame sections are spaced apart and connected by the pair of opposing side frame sections;
the contact lug is integrally formed on the upper frame section; and
only the upper and lower frame sections of the frame have a greater thickness than the grid.

2. The rolled electrode of claim 1, wherein the upper frame section and lower frame section of the frame has a greater thickness than the grid.

3. The rolled electrode of claim 1, wherein the contact lug has a greater thickness than the grid.

4. The rolled electrode of claim 3, wherein the section of the frame on which the contact lug is formed has a greater thickness than the grid, and the same thickness as the contact lug.

5. The rolled electrode of claim 1 further comprising a first face portion provided opposite a second face portion, the face portions formed by the frame and grid, wherein the portion having a greater thickness than the grid is provided on the first face portion of the electrode.

6. The rolled electrode of claim 1 further comprising a first face portion provided opposite a second face portion, the face portions formed by the frame and grid, wherein the portion having a greater thickness than the grid is provided on the first and second face portions.

7. A machine for the production of a rolled for a rechargeable battery comprising:
a feed for a strand of electrode material and rollers adapted to rotate in opposite directions with respect to one another, the rollers define a roller opening, the roller opening has a first opening provided at an end of the rollers and having a first width and a second opening having a second width, wherein the first width is greater than the second width and the strand of electrode material passes through the roller opening;
wherein the roller opening includes a third opening provided centrally in the roller opening and having a third width, wherein the first opening is separated from the third opening by the second opening, and the third width is greater than the second width;
wherein one of the first width or second width of the roller opening is increased by reducing the diameter of at least one of the rollers.

8. A method for production of a rolled electrode comprising: passing an electrode material in the form of a strand of previously rolled lead which has been provided with stamped-out areas for the grid structure is passed through a roller machine, wherein the rollers of the roller machine are profiled such that the electrode material which emerges from the rollers comprises electrodes having a portion with a greater thickness than the grid structure;
wherein the frame of the rolled electrode includes an upper frame section, a lower frame section and a pair of opposing side frame sections, wherein the upper frame section is provided substantially parallel to the lower frame section, and wherein the upper and lower frame sections are spaced apart and connected by the pair of opposing side frame sections;
the contact lug is integrally formed on the upper frame section; and
only the upper and lower frame sections of the frame have a greater thickness than the grid.

9. The rolled electrode of claim 1, wherein the upper frame section of the frame has a greater thickness than the grid and the same thickness as the contact lug.

10. The machine of claim 7, wherein one of the first width, second width or third width of the roller opening is increased by reducing the diameter of at least one of the rollers.

* * * * *